Dec. 24, 1935.   A. A. THOMAS   2,025,136
CIRCUIT CONTROLLING APPARATUS
Filed July 10, 1929   4 Sheets-Sheet 1

INVENTOR
Adolph A. Thomas

Dec. 24, 1935.  A. A. THOMAS  2,025,136
CIRCUIT CONTROLLING APPARATUS
Filed July 10, 1929    4 Sheets-Sheet 2

INVENTOR
Adolph A. Thomas

Dec. 24, 1935.        A. A. THOMAS        2,025,136
CIRCUIT CONTROLLING APPARATUS
Filed July 10, 1929        4 Sheets-Sheet 4

INVENTOR
Adolph A. Thomas

Patented Dec. 24, 1935

2,025,136

UNITED STATES PATENT OFFICE 2,025,136

CIRCUIT CONTROLLING APPARATUS

Adolph A. Thomas, New York, N. Y.

Application July 10, 1929, Serial No. 377,108

24 Claims. (Cl. 175—320)

This invention is for a novel device adapted to control automatically the operation of electric appliances in a predetermined manner, irrespective of whether the current is direct or alternating. One object of my invention is to regulate the temperature of electric heating utensils in the home, such as flat irons, toasters, percolators, waffle irons, and others. Another use of my new device is for automatically cutting an electric instrument out of circuit after a certain lapse of time. For example, radio receivers, electric fans, heating pads, washing machines, violet ray lamps, (in fact, any kind of electrically operated mechanism), when connected to my control device, will automatically cease to operate at a predetermined moment. A further feature of my invention includes adjustable means whereby an electric circuit either is periodically opened and closed automatically, as for controlling the temperature of a heating appliance, or remains open until manually closed.

In its practical embodiment, my circuit controller comprises a small box which contains the operative parts. An electric cord attached to the box is plugged into a house-lighting socket. The instrument to be controlled is connected to a pair of switch terminals in the box, which may be put on a table, chair or in some other convenient place. A suitable finger piece (such as a rotary knob, button, or lever) enables a person to regulate the working temperature of a heating appliance connected to the control box. This regulation of temperature is effected by a thermostatic switch adapted to open and close the heating circuit at predetermined intervals, which may be varied by simply turning the knob or other finger piece. If the control box is used with a device intended to be permanently put out of operation after a certain length of time, the knob is turned to vary that interval as desired. This finger piece is also adjustable to eliminate the time control, so that the circuit remains closed without interruption until opened by hand. Another movable finger piece on the box sets the inside mechanism for either automatic or manual closing of the circuit after the latter has been opened by the thermostat switch. I may use a pair of signal lights to keep the operator informed whether the manual or the automatic reset is on.

It is thus seen that my new device is readily attached to any kind of electric implement for controlling its operation in various ways. My invention makes it unnecessary to incorporate thermostat switches in electric heating appliances for temperature control, as heretofore done, because one of my little control boxes takes care of all such appliances in a household. The novel features and practical advantages of my invention will be fully understood from a description of the accompanying drawings, in which—

Fig. 3 shows the interior of the box on a larger scale, with the thermostat switch in normal circuit-closing position and the automatic reset on;

Figure 1:
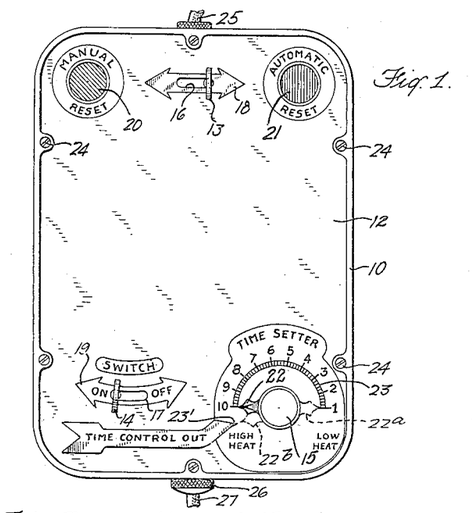
Fig. 1 shows one form of my control device in face view.
Figure 2:
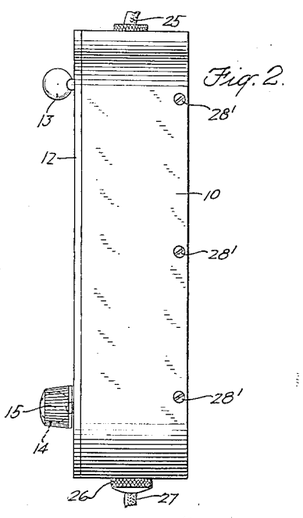
Fig. 2 is a side view of Fig. 1.

Referring to Figs. 1 and 2, there is a box or casing 10 provided with a cover plate 12 from which project three finger pieces 13, 14 and 15. The finger pieces 13 and 14 extend through slots 16 and 17, respectively, which may be formed in ornamental escutcheon plates 18 and 19. On opposite sides of the slidable finger piece 13 are glass windows or lenses 20 and 21, which are preferably colored. In Fig. 1, the lens 20 has been assumed to be green and the lens 21 red, but these colors may be changed as desired. The finger piece 15 is shown in the form of a rotary knob having a pointer 22 arranged to move over an index 23. The cover 12 of box 10 is preferably removable and is held in place by screws 24, which enter holes in bosses 24' at the edge of the box. To permit removal of the cover, the finger pieces 13, 14 and 15 are detachably connected with their associated operating members inside the box, as will later be explained. A cable 25 comprising a pair of electric conductors leads into box 10 at one end for connecting certain operative parts in circuit. This cable is supposed to terminate in a plug adapted to be inserted in an ordinary house-lighting circuit. It is immaterial whether the current is direct or alternating. At the other end of box 10 is a switch socket for receiving a plug 26 connected to a cable 27, which consists of a pair of conductors leading to a suitable electric appliance, such as a heating device, an electric fan, a radio receiver, or any electric mechanism intended to be controlled by the apparatus in the box.

The various results obtained by a manipulation of the finger pieces 13, 14 and 15 are the following: When the finger piece 13 is at the right, as shown in Fig. 1, a thermostatic switch in box 10 automatically opens and closes the work circuit at predetermined intervals. If the appliance attached to cable 27 is an electric heating implement (for example, a flat iron, waffle iron, toaster, and the like), the automatic opening and closing of the circuit keeps the temperature of the implement within the desired limits. This temperature may be controlled by turning the knob 15 to set the pointer 22 at any mark on scale 23. When the pointer is in position 22a opposite the lowest mark on the scale, the prevailing temperature of the heating appliance connected to box 10 is at its lowest limit, while the highest temperature is obtained by moving the pointer 22 to the indicator mark "10", as shown in full lines in Fig. 1. When the pointer is in the extreme position 22b, the circuit-controlling operation is entirely eliminated and the box operates like an ordinary switch. If the finger piece 13 is shifted to the left end of slot 16, the thermostatic switch inside the box opens the circuit after a predetermined interval, and the circuit remains open until manually closed by moving the switch piece 14 to "on" position.

Signal lamps inside of box 10 are automatically lighted to indicate whether the automatic reset or the manual reset is on. Thus, when the finger piece 13 is moved to the right, as shown in Fig. 1, the red lens 21 is lighted and the operator knows that, as long as this red light is on, the temperature of the connected heating appliance is under automatic control. When the operator shifts the finger piece 13 to the left, the green lens 20 is lighted to inform him that the circuit will be open after a certain interval and will remain open until manually closed by means of the finger piece 14. When the manual reset is on, the interval of time during which the circuit remains open is regulated by turning the knob 15 to move the pointer 22 to the desired mark on scale 23, which now operates as a time setter. Thus, when the pointer 22 is in position 22a, the period during which the circuit remains closed is of shortest duration, while the longest period of closure is obtained by moving the pointer to the highest mark "10" on the scale. The numbers on this scale are not intended to indicate absolute time, but are arbitrary divisions representing a certain number of minutes, depending on the way certain parts of the control mechanism are designed. These time intervals need be only approximate, for clock-like precision is not necessary.

The base or bottom plate 28 of box 10 has an upstanding lug or boss 29 which carries a thermostat bar 30 of usual bimetallic construction. The bar 30 is preferably U-shaped and one end of it is rigidly connected to lug 29 by bolts 31 or otherwise. The supporting lug 29 may be cast integral with plate 28, or it may be a separate piece attached to the plate in any practical way. The thermostat bar 30 may be of any suitable shape, but I prefer a U-shaped bar, because the curved portion 30' acts like a hinge about which the main body portion of the bar moves during predetermined changes of temperature. An insulated coil 32 is mounted on thermostat bar 30 for heating the same to high temperature limits. This heating coil may consist of fine resistance wire wound on an insulating jacket or sleeve of asbestos, mica, or other suitable material. The circuit connections of coil 32 will be described later on. It is enough to say at this time that, when the coil 32 is connected in circuit, the heating effect of the current passing through the high resistance wire raises the temperature of thermostat bar 30 so that the latter moves toward the left from its normal position. This will be clear by comparing Figs. 3 and 5. Let us now see what happens during this movement of the thermostat bar at predetermined high temperature.

Figure 3:
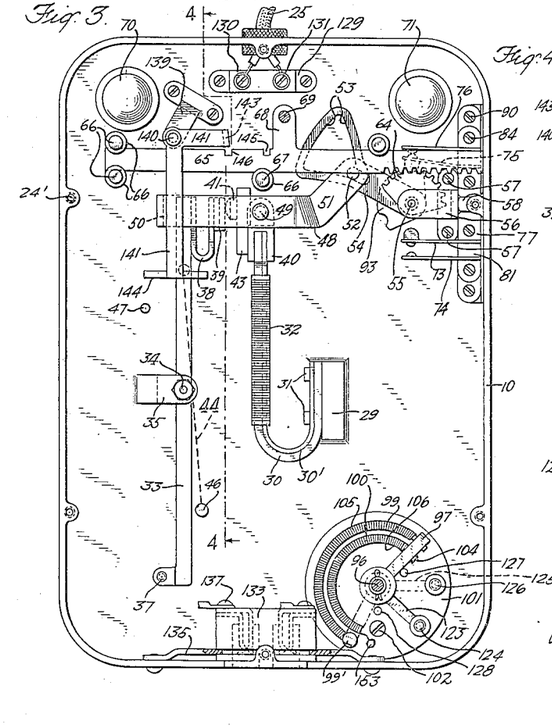
Figure 4:
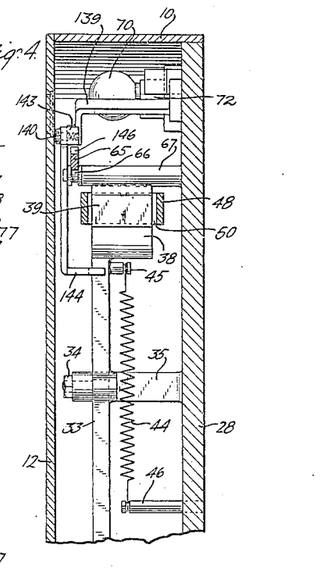
Fig. 4 represents a section on line 4—4 of Fig. 3.
Figure 5:
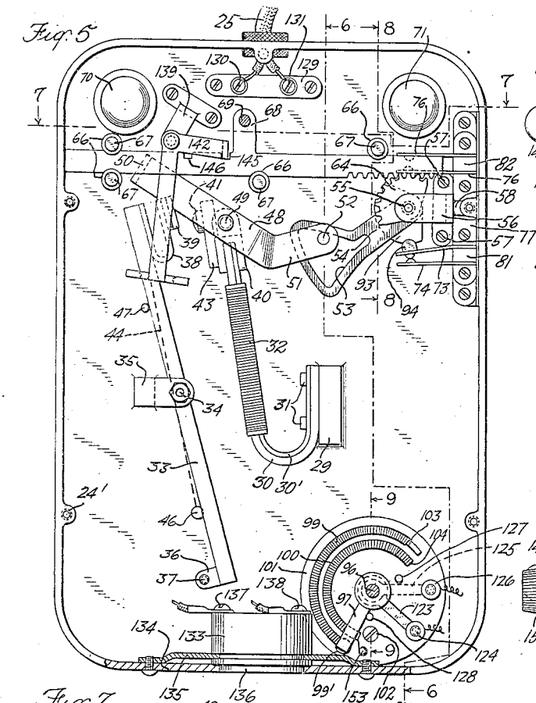
Fig. 5 is similar to Fig. 3, except that the thermostat switch is open and the automatic reset is off, so that the switch remains open.
Figure 6:
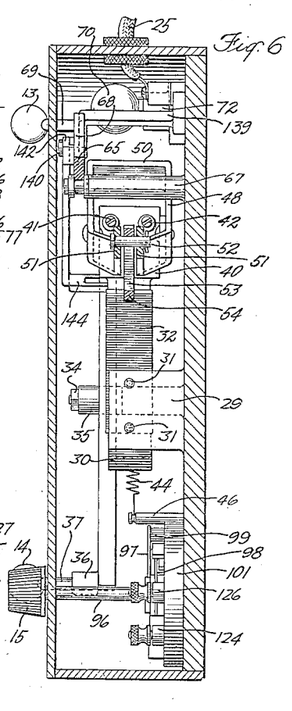
Fig. 6 shows a side view approximately on the broken line 6—6 of Fig. 5.
Figure 11:
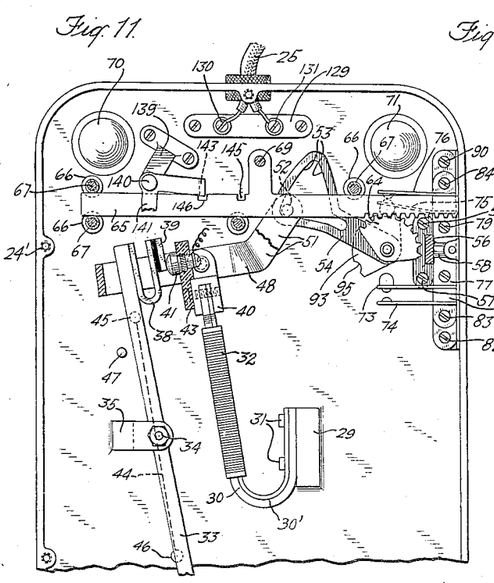
Fig. 11 is a view similar to Fig. 3, but showing the parts of the thermostat switch in an intermediate position just before they snap into the final circuit-breaking position of Fig. 5.

A switch lever 33 is pivoted at 34 on a bracket 35 projecting upward from the bottom plate 28 of box 10. As in the case of lug 29, the supporting bracket 35 may either be integral with plate 28 or attached thereto as a separate part. One end of switch lever 33 has a lateral extension 36 adapted to receive a screw member 37 which carries the finger piece 14. This finger piece may be a disk attached to (or forming an integral enlargement of) the screw member 37, which is removably secured to the lateral extension 36 by simply screwing it tight. Consequently, by turning the finger piece 14 in a left-handed way, the member 37 is unscrewed and can be removed. The other end of switch lever 33 carries a U-shaped spring blade 38, which is provided with an insulated contact piece 39 of good conducting metal. The free end of thermostat bar 30 carries a head 40 on which two insulated contacts 41 and 42 are mounted. If the head 40 is of metal, the contacts 41—42 are mounted on an insulating plate 43 attached to the head, as will be clear from Fig. 11. The contacts 41 and 42 are normally engaged by the bridge piece 39 to close the circuit of the electric appliance connected to cable 27. The switch member 39 is held in pressure engagement with contacts 41 and 42 by a contracting coil spring 44, which is connected at one end to a cross-pin 45 on lever 33 and at the other end to a fixed pin 43 mounted on the bottom plate 28 of box 10. In Figs. 3, 5 and 11, the spring 44 is diagrammatically indicated for clearness by a dotted line, which may be considered as representing the axis of pull or tension of the spring.

It is clear from Fig. 3 that, in the normal position of thermostat bar 30 and switch arm 33, the tension line of spring 44 is to the right of pivot point 34 of lever 33, so that the switch member 39 is held in firm pressure engagement with the insulated contacts 41 and 42 to close the electric circuit through heating coil 32 and cable 27. When the temperature of thermostat bar 30 reaches a certain point, the upper end of the bar begins to move toward the left, as viewed in Fig. 3, and pushes the upper end of switch lever 33 in the same direction. The switch plate 39 remains in engagement with contacts 41 and 42 until the tension line of spring 44 crosses the pivot 34, whereupon the spring quickly snaps the lever 33 away from the thermostat bar 30 against a fixed stop 47. During this sudden movement of switch lever 33 under the action of spring 44, the switch member 39 is jerked away from contacts 41 and 42, so that the circuit is abruptly opened without arcing. Fig. 11 shows the movable members 30 and 33 just before the moment of snapping, while Fig. 5 shows the switch lever 33 in open position. When the switch lever 33 is in normal circuit-closing position, as shown in Fig. 3, the finger piece 14 on the top of box 10 is at the left of slot 17 to indicate that the switch is closed. When, however, the switch lever 33 is in open position, as shown in Fig. 5, the finger piece 14 is at the right of slot 17 to inform the operator that the switch is off.

When the circuit of heating coil 32 is opened by the switch plate 39 on lever 33, as above described, the thermostat bar 30 begins to cool and moves back to normal position. It is evident that, if the switch lever 33 is left in the position shown in Fig. 5, the circuit remains open, irrespective of the movements of thermostat bar 30 on cooling. However, if the thermostat bar 30 is to be used for controlling the temperature of the heating appliance attached to cable 27, it is not sufficient merely to break the circuit when a predetermined high temperature is reached, but it is also necessary to close the circuit automatically when the thermostat bar begins to cool. This automatic closing of the circuit is accomplished in the present instance by means of a yoke 48 pivoted on a cross-pin 49 carried bf the head 40 of thermostat bar 30. The yoke 48 is a U-shaped member conveniently made from a single piece of sheet metal, having a cross-piece 50 at one end and a pair of extensions 51 at the other end. A pin 52 connecting the extensions 51 passes through a cam slot 53 of an arm 54 pivoted on a rotary shaft 55, which is carried by a bracket 56 secured to the bottom plate 28 by screws 57, or otherwise. The bracket 56 may have a lateral brace 58 rigidly connected to the adjacent side of box 10 by a screw 59. The rotary shaft 55 is mounted at its lower end in a socket 60 in the bottom plate 28, and the upper end of the shaft extends into an aligned opening 61 in bracket 56. There are, of course, other ways of supporting the shaft 55, but the mounting just described has the practical advantage of permitting easy assembly of the parts and the removal of cover 12. The cam arm 54 has a hub or collar 62 through which the shaft 55 extends, and a pin 63 connects these parts so that they always operate in unison.

The rotary shaft 55 carries a segmental gear or pinion 64 arranged in permanent mesh with a rack bar 65 supported for transverse reciprocable movement by rollers 66 which are mounted on pins or studs 67 projecting upwardly from the base plate 28. The rack bar 65 has a lateral extension 68 to which the shank 69 of finger piece 13 is attached. The shank 69 may simply be a screwthreaded extension of finger piece 13, whereby the latter is rigidly yet removably connected to the rack bar 65. When the finger piece 13 is shifted to one side or the other of slot 16, the rack bar 65 rotates the segmental gear 64 and therefore shaft 55. The cam slot 53 of arm 54 is so shaped that, when the rack bar 65 is in right-hand position as shown in Figs. 3 and 11 (that is, when the finger piece 13 is in the position illustrated in Fig. 1), the pivoted yoke 48 on thermostat bar 30 embraces the upper end of switch lever 33. Consequently, as the cooling thermostat bar 30 moves back to normal position after the circuit has been opened, the cross-piece 50 of yoke 48 engages the upper end of lever 33 and pulls it toward the right until the tensioned spring 44 snaps the lever back to normal circuit-closing position, as shown in Fig. 3.

The length of restoring yoke 48 is so calculated that the switch piece 39 is not snapped into engagement with contacts 41 and 42 until the thermostat bar 30 has practically reached normal position. When the circuit is again closed, the current in coil 32 heats the thermostat bar 30 and the circuit-breaking operation previously described is repeated. It is clear from Fig. 11 that the yoke 48 does not interfere with the movement of switch lever 33 to open position under the action of spring 44. The shape of cam slot 53 is such as to permit movement of thermostat bar 30 without altering the position of yoke 48. In other words, the cross-pin 52 of yoke 48 rides idly in the cam slot during the thermostatic movements of the bar. This will be readily seen by comparing Figs. 3 and 11. The intervals during which the circuit is open depends upon the thermostatic characteristics of bar 30 and on the temperature of the bar when the circuit of heating coil 32 is interrupted. It lies within the expected skill of the mechanic to use a thermostat bar or equivalent member capable of performing its intended function.

When it is desired to let the circuit remain open after it has been broken by the thermostat bar 30, as shown in Fig. 5, it is only necessary to shift the finger piece 13 to the left. This causes the rack bar 65 to actuate the segmental gear 64 counterclockwise, as viewed in Figs. 3 and 5. As a result of this operation, the cam arm 54 is rocked downward and the cam slot 53 throws the front end of yoke 48 upward out of the path of switch lever 33. This is clearly illustrated in Fig. 5. With the yoke 48 thus moved into inoperative position, the cooling thermostat bar 30 returns to normal position without actuating the switch lever 33. The cam slot 53 is so shaped that the pin 52 rides idly therein during the thermostatic movements of bar 30 to permit the yoke 48 to remain in its inoperative condition. The pivotal mounting of yoke 48 on pin 49 is such that the yoke is safely held by friction in either of its two positions. In addition to this frictional retaining means, the cross-pin 52 cooperates with the edges of cam slot 53 to retain the yoke 48 in one position or the other. This will be understood by looking at Figs. 5 and 11.

Figure 12:
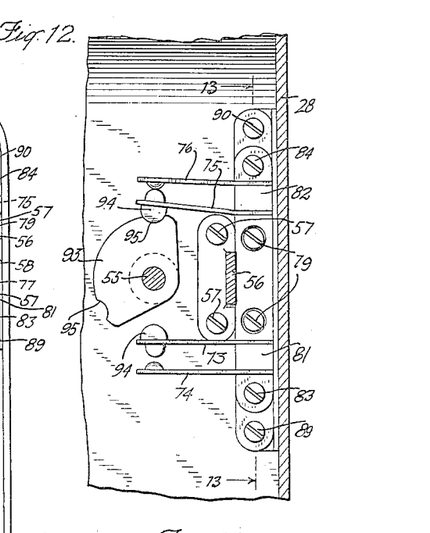
Fig. 12 shows an enlarged fragmentary view on line 12—12 of Fig. 7 to bring out more clearly the switch connections that operate the two signal lamps associated with the manual and automatic reset arrangement.
Figure 13:
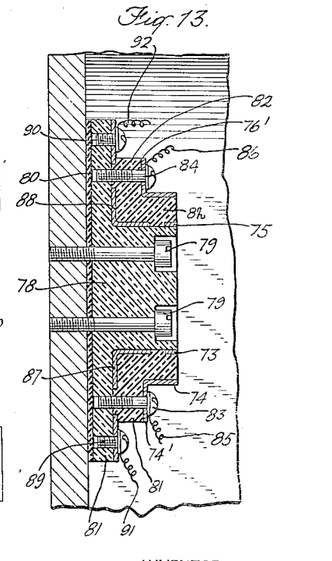
Fig. 13 is a section on line 13—13 of Fig. 12.

Two electric signal lamps 70 and 71 are mounted in ordinary sockets 72 attached to the bottom plate 28 of casing 10. The lamp 70 is arranged below the green lens 20 and the lamp 71 is below the red lens 21. When the finger piece 13 is moved toward the left, the circuit of lamp 70 is automatically closed through a pair of switch contacts 73 and 74. When the finger piece 13 is moved toward the right, the circuit of lamp 71 is closed through a pair of switch contacts 75 and 76. These two pairs of contacts are shown in the form of spring blades mounted in an insulating support indicated as a whole by 77. The structural details of this support are best shown in the enlarged views of Figs. 12 and 13, to which I shall now refer.

The switch support 77 comprises an insulating base 78 secured to the bottom plate 28 of the box by bolts or screws 79. If the box 10 is of metal, a sheet 80 of rubber or mica may be interposed to fortify the insulation of base 78 from the metal box. The base member 78 carries a pair of L-shaped insulating pieces 81 and 82 secured by screws 83 and 84. The spring blades 74 and 76 are provided with right-angled extensions 74' and 76', respectively, for receiving the screws 83 and 84, which are thus in good metallic contact with the spring blades. The screws 83 and 84 may therefore be used as binding posts for attaching a conductor 85 to spring arm 74, and a conductor 86 to spring arm 76. The other two switch arms 73 and 75 are provided with right-angled extensions 87 and 88, respectively, which are secured to base 78 by the screws 83 and 84, and also by two additional screws 89 and 90. The screws 83 and 84 are insulated from the extensions 87 and 88, but the screws 89 and 90 are in metallic contact with these extensions and serve as binding posts for conductors 91 and 92. The above described mounting of the two signal switches 73—74 and 75—76 is not to be considered as an essential part of my invention unless expressly recited in the claims, for it is obvious that these switches may be mounted and arranged in any practical way.

The rotary shaft 55 carries a cam disk 93 arranged between the switch arms 73 and 75, and in alignment therewith. These two switch arms are each provided at the free end with an insulating projection or button 94 adapted to be engaged by the cam disk 93. When the rack bar 65 is moved to the right, as shown in Fig. 11, the cam disk 93 engages the rounded button 94 and forces the spring arm 75 into pressure contact with the adjacent arm 76, thereby closing the circuit through lamp 71 which illuminates the red lens 21. The operator is thus visually informed by an unmistakable signal that the automatic reset of the control box is on, and that the circuit will be automatically opened and closed. When the rack bar 65 is shifted toward the left by means of the finger piece 13, the cam disk 93 engages the insulated button 94 of switch arm 73 and moves the latter into contact with the associated arm 74. This closes the circuit through lamp 70, which illuminates the green lens 20 and informs the operator that the control box is now set for manual closing of the switch. The cam disk 93 may be provided with a pair of recesses for receiving the rounded buttons 94, whereby the spring arms 73 and 75 hold the cam disk and all connected parts in actuated position. These connected parts include the cam arm 54, rack bar 65 and finger piece 13.

The finger piece 15 is connected to a rod 96 which operates a pair of rheostat arms 97 and 98 arranged to move over separate resistance elements 99 and 100, respectively. In the broader aspect of my invention, the two rheostats controlled by the rotary knob 15 may be of any practical construction, but in Fig. 9 I have shown a rheostat assembly that is easily put together. The various parts comprising the double rheostat are mounted on an insulating plate 101 secured to the bottom of the box by screws 102 or otherwise. The resistance elements 99 and 100 may simply consist of fine wire wound on arcuate insulating strips 103 and 104, respectively, which are firmly set in concentric grooves 105 and 106 in disk 101. The outer resistance element 99 projects above the inner resistance element 100, so that the insulated contact arms 97 and 98 may engage these elements without interfering with each other. This will be clear from Fig. 9. The shaft 96 extends into a metal sleeve 107 to which it is connected by a cross pin 108. The metal sleeve 107 extends through a central opening in disk 101 and is held against axial displacement by a flange 109 bearing against a metal washer 110 seated in the recess 112 of the disk. The metal sleeve 107 carries an insulating bushing 113, which is locked to the sleeve by a key 114 or otherwise. The contact arm 98 is mounted on bushing 113 and is connected thereto in any practical way, as by a key 115. The rotary contact arm 98 is spaced from the insulating disk 101 by a metal collar or washer 116 mounted on bushing 113. The collar 116 bears against a metal ring 117 inserted in the base plate 101. An insulating ring or collar 118 holds the outer contact arm 97 properly spaced from the inner arm 98. The metal sleeve 107 is formed with an axial slot or groove 119 adapted to receive a lug or projection 120 on arm 97, whereby the latter is locked to the sleeve. An expanding coil spring 121 surrounds the sleeve 107 between the hub portion 97' of arm 97 and a washer 122 adjacent the cross pin 108. The spring 121 holds the rheostat arms 97 and 98 in firm pressure contact with their respective resistance elements 99 and 100. The metal ring 117 is part of a contact strip 123 (see Figs. 3 and 5) mounted on the insulated base 101 and terminating in a binding post 124. The metal washer 110, which is always in electrical contact with the metal sleeve 107, may be part of (or otherwise connected to) a conducting strip 125 mounted on the underside of disk 101 and terminating in a second binding post 126. It is seen from this that the insulated binding posts 124 and 126 are electrically connected to the rheostat arms 98 and 97, respectively. These two arms and their associated resistance elements 99 and 100 are completely insulated from each other, so that we really have two rheostats in one. The parts above described are very easily assembled on base plate 101 for insertion into the casing 10 as a unitary device. If the signal lamps 70 and 71 are omitted, the rheostat parts 98—100 are not necessary.

The rotary movements of rheostat arms 97 and 98 are limited by a pair of fixed stops 127 and 128 mounted on the insulating base 101. When the rheostat arms are moved against the stop 127, as shown in Fig. 3, the arm 97 may be out of contact with resistance element 99 and simply rest on the insulated core 103. This cuts the resistance 99 out of circuit and maximum current passes through the heating coil 32, because the resistance is in shunt to the heating coil. The end turns of resistance wire 99 may, however, be engaged by the arm 97 when the latter rests against stop 127 to include the maximum amount of resistance in shunt to the heating coil 32. In either case, when the rheostat arm 97 is moved against stop 127, the current flowing through coil 32 is of maximum value. This will be made clear when I describe the circuit diagram in Fig. 14. The other rheostat arm 98 is at the extreme end of the associated resistance element 100 when that arm is moved against the stop 127, so that practically all the resistance is cut into the circuit of lamp 70, which now burns very dimly.

The full-line position of rheostat arm 97 (and also arm 98) in Fig. 3 corresponds to the dotted-line position 22a of the pointer 22 in Fig. 1. When the pointer 22 is opposite the indicator mark 10, as shown in full lines in Fig. 1, the rheostat arms 97 and 98 are in the position illustrated in full lines in Fig. 5. This position of the rheostat arms, it will be observed, is 180 degrees from the position shown in Fig. 3, and the amount of resistance 99 now included is a minimum. The arms 97 and 98 do not engage the stop 128, and they are therefore not in their extreme left position. When the knob 15 is turned to move the pointer 22 into position 22b opposite the indicator marked 23' (see Fig. 1), the arm 97 engages the terminal 99' of resistance wire 99 and the latter is entirely cut out. At the same time, the arm 98 includes a minimum amount of resistance 100 in the circuit of lamp 70, so that the same burns with maximum brightness. Between the two extreme positions of the rheostat arms as defined by the stops 127 and 128, these arms may be moved to any intermediate position to regulate the amount of current passing through the heating coil 32. As will appear later, by regulating the current in coil 32, it is possible to control the temperature of the electric heating appliance connected to the control box 10, or to regulate the interval of time during which the circuit shall remain closed.

The base plate 28 of box 10 is provided with an insulating strip 129 which carries a pair of binding posts 130 and 131 for connecting the wires of cable 25. This connection is permanent, for the cable 25 is supposed to be a part of the control box as sold in the market. It is only necessary for the user to insert the plug 132 of the cable into the house-lighting circuit (see Fig. 14). The outer casing or box 10 contains a suitable switch 133, which may conveniently be secured to the end wall 134 of the box by a strip 135. An opening 136 in the end wall 134 permits the insertion of plug 26, which is supposed to be connected to whatever electric appliance is intended to be controlled by the thermostatic switch mechanism in box 10. The structural details of switch 133 are immaterial and need not be shown or described, because various styles of switches may be purchased in the open market. It is enough to say that the contacts inside the switch are connected to a pair of outside binding posts 137 and 138.

Figures 7, 8, 9, 10:
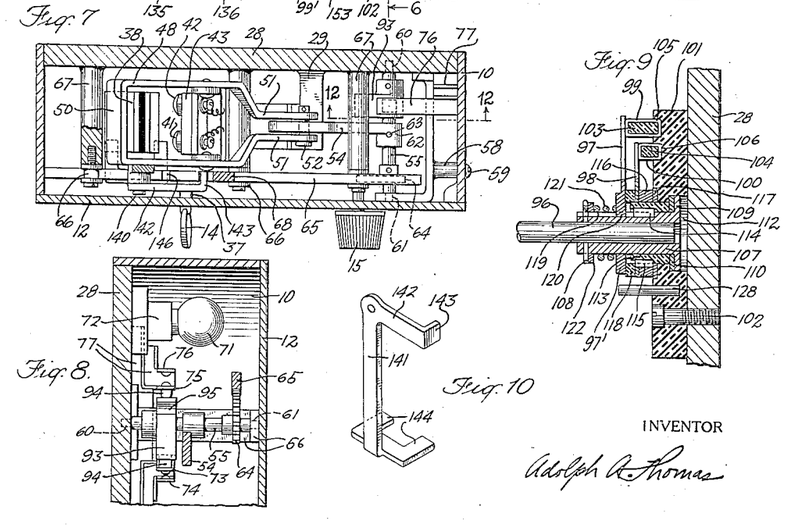
Fig. 7 is a transverse section on line 7—7 of Fig. 5.
Fig. 8 is a fragmentary view on line 8—8 of Fig. 5.
Fig. 9 represents an enlarged section on line 9—9 of Fig. 5 to show more clearly the construction of double rheostat used in this particular embodiment.
Fig. 10 illustrates in perspective a certain locking member adapted to prevent operation of the manual and automatic reset arrangement when the thermostat switch is in the position shown in Fig. 5.

I have already described how the pivoted yoke 48 mounted on the thermostat bar 30 is moved into operative and inoperative positions by simply shifting the finger piece 13 which actuates the rack bar 65. It is clear from Fig. 5 that, when the switch lever 33 is open, the yoke 48 can not be rocked down to operative position, because the cross-piece 50 would strike the top of the switch lever. I have therefore provided means for automatically locking the rack bar 65 against operation when the switch lever 33 is in open positon. A bracket 139 fixed on the base plate 28 of casing 10 carries a pin 140 on which a depending arm 141 is pivoted. As best shown in Fig. 10, the arm 141 has a right-angled extension 142, which terminates in a lateral catch 143. The lower end of arm 141 is in the shape of a yoke 144 adapted to straddle the pivoted switch lever 33. The slidable rack bar 65 has a pair of notches 145 and 146. Referring to Fig. 5, it is seen that when the switch lever 33 is in open position, the free end of arm 142 is rocked down, so that the catch 143 engages notch 145 of rack bar 65, whereby the latter is positively locked against movement toward the right. The rack bar can not be moved toward the left, because it is already in its extreme left position, abutting against the left side of casing 10. When the rack bar 65 is in the position shown in Fig. 11, the catch 143 engages notch 146 as long as the switch lever 33 is in open position. This may be explained somewhat more simply by referring to Fig. 1: When the finger piece 14 is in "off" position at the right end of slot 17, the finger piece 13 is locked against movement, no matter at which end of slot 16 it happens to be.

Figure 14:
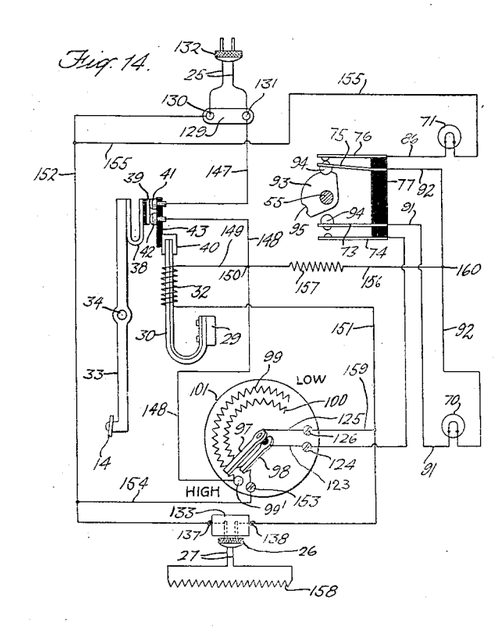
Fig. 14 is a circuit diagram of the electrical connections for the various parts of the control box shown in the preceding figures.

Fig. 14 indicates diagrammatically how the various electrical parts in control box 10 are operatively connected in circuit. In describing these connections, I shall use the convenient word "wire" to indicate any suitable electrical conductor, whether in the form of a wire, bar, plate, rod, or what not. A wire 147 connects terminal 131 with contact 41, and contact 42 is connected by wire 148 to the rheostat terminal 99'. One side of heating coil 32 is connected by wire 149 to wire 148 at point 150, and the other side of the coil is connected by wire 151 to binding post 138 of switch 133. The other binding post 137 of this switch is connected to terminal 130 by wire 152. One end of resistance element 100 is connected to a binding post 153 on disk 101, and a wire 154 connects this binding post to conductor 152. The signal lamp 70 is connected in series with conductors 91 and 92 already referred to. The other signal lamp 71 is connected in series with conductors 86 and 155, the latter being connected to conductor 152. A wire 156 connects the two conductors 92 and 148, and a resistance 157 may be included to cut down the normal voltage in lamps 70 and 71 if necessary. The diagrammatic outline 158 is intended to represent any suitable current-consuming device connected to the cable leads 27. If this device is a heating appliance, the outline 158 may be regarded as indicating an electric heating unit. The position of the rheostat arms 97 and 98 in Fig. 14 corresponds to the full-line position of pointer 22 in Fig. 1 opposite the indicator mark "10". The position of cam disk 93 in Fig. 14 corresponds to the position of finger piece 13, as shown in Fig. 1; that is to say, the automatic reset is on.

Assuming the switch arm 33 in normal circuit-closing position, the following circuit connections are established in Fig. 14: from binding post 131, wire 147, contacts 41 and 42 which are now closed by contact piece 39, wire 148 to point 150, where the current divides into three paths, one of which goes through wire 149, coil 32, wire 151, switch 133 which connects the electric device 158 in circuit, and through wire 152 to return terminal 130. It is thus clear that the heating coil 32 is in series with the current-consuming element 158. The second current path from point 150 goes through wire 148 to binding post 99', through the resistance element 99, arm 97, wire 125, binding post 126, wires 159 and 151, and from there through the electric appliance 158, as previously described. The resistance 99 is therefore in shunt to the heating coil 32, and the amount of resistance cut in determines the value of the current passing through the coil. The third current path leading from point 150 goes through lamp resistance 157, wire 146 to point 160, wire 92, across the closed switch contacts 75 and 76 through the signal lamp 71, and through wire 155 to the return lead 152. The signal lamp 71 illuminates the red lens 21, whereby the operator is visually informed that the automatic reset is on. No current passes through the lamp 70, because the switch arms 73 and 74 are open.

The circuits described in the preceding paragraph remain closed as long as the connecting piece 39 of switch lever 33 engages the contacts 41 and 42 of thermostat bar 30. The current passing through coil 32 heats the thermostat bar so that the latter moves toward the left and finally causes the spring 44 to snap the switch lever 33 into open position, as heretofore explained in detail. When the contacts 41 and 42 are broken, the circuits of coil 32, lamp 71 and consuming device 158 are opened. As we are now assuming that the yoke 48 is in operative position, these circuits will be automatically closed when the thermostat bar 30 has sufficiently cooled to pull the switch lever 33 back to normal position. The circuits remain closed until the current in coil 32 has raised the temperature of thermostat bar 30 to a predetermined amount. In this way, the current-consuming device 158 is automatically cut into and out of circuit at predetermined intervals.

It is evident that the prevailing temperature of the heating appliance 158 depends upon the frequency at which the circuit is opened, and this frequency of interruption is governed by the amount of current passing through coil 32. As already explained, the current through coil 32 is controlled by the rheostat arm 97, which is manually set by the finger piece 15. Since the resistance 99 is in shunt to coil 32, it is clear that the current through the coil is increased proportionately to the increase of resistance 99 in circuit. With the arm 97 in the position shown in Fig. 14, a minimum amount of resistance 99 is in shunt to coil 32, so that minimum current flows through the coil, and it takes a correspondingly long interval of time to heat the thermostat bar 30 to circuit-opening temperature. Since the circuit thus remains closed through the longest periods of time, the prevailing temperature of the heating appliances 158 is correspondingly high. As the pointer 22 is turned clockwise over the indicator 23, more resistance 99 is gradually included and the current through coil 32 is correspondingly increased until the maximum amount of current flows through the coil when the pointer 22 is in position 22a. With a maximum flow of current through coil 32, it takes a minimum amount of time to heat the thermostat bar 30 to circuit-opening temperature. Since the circuit through the heating appliance 158 is now interrupted at highest frequency, it is manifest that the prevailing temperature of the appliance is at its lowest.

Between the extreme positions "1" and "10" of pointer 22 for lowest and highest temperature limits in device 158, it is possible to obtain any degree of intermediate heat by simply turning the pointer to the required mark. When the pointer 22 is at the extreme left position 22b, the rheostat arm 97 engages the terminal 99' and the heating coil 32 is short-circuited, so that practically no current passes therethrough. This means that the thermostatic control is eliminated, and the switch contacts 41—42 remain closed for a continuous flow of current through the consuming device 158. This explains why in Fig. 1 the legend "Time control out" is associated with the indicator mark 23'. In other words, when the pointer 22 is in position 22b, the control box acts like an ordinary switch.

The resistance element 100 is connected in series with the signal lamp 70 for varying the brilliancy of the light in accordance with the position of rheostat arm 98. When the switch arms 73 and 74 are open, the resistance 100 is inoperative and the arm 98 moves idly along with the other rheostat arm 97. As previously explained, the lamp 70 is in circuit only when the finger piece 13 is moved to the left toward the green lens 20. Assuming the switch 73—74 closed by the cam disk 93, and also assuming that the contacts 41 and 42 are closed, the circuit of lamp 70 is completed through rheostat arm 98 and resistance 100. When the arm 98 is in the position shown in Fig. 14, nearly all the resistance is cut out and the lamp 70 burns with high luminosity, which is increased to a maximum when the pointer 22 is in position 22b. When the rheostat arm 98 is in extreme right position against the stop 127, nearly all the resistance 100 is in series with lamp 70, so that it burns with low visibility. For any intermediate position of arm 98, the luminosity of lamp 70 varies proportionately.

The brightness of lamp 70 is a rough visual indication of the prevailing heat in appliance 158, or of the period during which the circuit remains closed. Thus, when the green lens 20 glows brightest (the green being suggestive of coolness), the operator is informed that the heating appliance 158 is operating at lowest temperature, and vice versa. If the device 158 is not a heating instrument but some other kind of current-consuming device, such as an electric fan, washing machine, radio receiver and the like, the highest glow of green lens 20 tells the operator that the circuit will remain closed for the shortest space of time. It is, of course, possible to connect the resistance 100 in such a way that the lamp 70 shines brightest when the operating circuit remains closed the longest period of time, which happens when the current through the thermostat coil 32 is weakest. If the varying brightness of lamp 70 is not desired, the rheostat 98—100 is omitted and the wire 85 is connected directly to wire 154. In the broader aspect of my invention, the signal lamps 70 and 71 are not necessary, but they serve the purpose of indicating visually the opening and closing of the circuit and thereby add to the practical value of the invention.

Figs. 15–19 illustrate a modified construction which accomplishes the same results as the embodiment of Figs. 1–14, but with the added advantages of greater simplicity. To avoid needless repetition, those parts in Figs. 15–19 that correspond to similar parts in Figs. 1–14 are indicated by the same reference numerals without further explanation. Referring to Figs. 15–19, a switch lever 160 is pivoted at 161 on a stud 162 projecting from the bottom plate 28 of the control box. The lower end of switch lever 160 has a lateral extension 162 for receiving a shank 163, which is supposed to carry a suitable finger piece projecting through a slot in the cover plate 12 of the box. It may be assumed that switch lever 160 is manually operated in the same way as switch lever 33. A block or bracket 164 mounted on the bottom plate 28 carries a spring arm 165 which terminates in a V-shaped end 166 arranged to engage a pin 167 projecting laterally from switch lever 169. The V-shaped end of spring 165 firmly holds the pivoted lever 160 in either of its two positions. The switch lever 160 carries two insulated contacts 168 and 169. The fixed block or bracket 164 is provided with an insulating plate 170 on which three contacts 171, 172 and 173 are mounted. When the switch lever 160 is in normal circuit-closing position, contact 168 engages the fixed contact 171 and switch member 169 spans the two contacts 172 and 173. The movable switch parts 168 and 169 are preferably spring members of sufficient resiliency to insure a firm pressure engagement with the associated contacts 171, 172 and 173, so that the circuits are held positively closed.

An arm 174 is pivoted at 175 adjacent the thermostat bar 30, and the free end of this arm carries an extension 176 which may be shaped from a single piece of stiff sheet metal. The extension 176 comprises a pair of spaced fingers 177 and a tail 178 bent downwardly at 179. A contracting coil spring 180 is connected at one end to a pin 181 projecting laterally from arm 174, and at its lower end to a fixed stud 182 on the bottom plate 28. The pivoted arm 174 is arranged in the path of thermostat bar 30 and is thus controlled by the position of the bar. A U-shaped frame 183 is slidably mounted on a pair of studs 184 secured to bosses 185 on the bottom plate 28 of the control box. The sides 186 of frame 183 are provided with aligned slots 187 through which the studs or pins 184 extend. These supporting studs may be pins screwed into bosses 185 and may have bearing sleeves 188 to facilitate the movements of frame 183. The sides 186 of this frame are provided with shoulders 189 and 190. One end of the slidable frame 183 is bent laterally to provide a cross connection 191 which carries an insulated contact plate 192. A stud or bracket 193 on the bottom plate 28 carries a spring member 194 on which two insulated contacts 195 and 196 are mounted. A spring arm 197 supported at one end on the bottom plate 28 carries at its free end a roller 198 arranged to engage a cam projection 199 on the slidable frame 183. The spring-pressed roller 198 cooperates with the cam projection 199 to hold the slidable frame 183 in either of its two positions.

The contracting coil spring 180 connected to the pivoted arm 174 normally holds the fingers 177 against the shoulders 189 of frame 183, so that the switch plate 192 is pressed firmly against the resiliently mounted contacts 195 and 196. The cam roller 198 assists the spring 180 in normally holding the frame 183 in circuit-closing position. As the temperature of thermostat bar 30 increases, due to the current in heating coil 32, the free end of the bar moves toward the left and engages the arm 174, so that the latter is gradually pushed toward the left out of contact with frame 83, which remains stationary for the time being. When the fingers 177 move away from the shoulders 189 of frame 183, the latter is firmly held in circuit-closing position by the spring-pressed cam roller 198, so that the circuit remains closed while the thermostat bar 30 and arm 174 are moving toward the left. When the tension line of spring 180 crosses the pivot point 175, the arm 174 is snapped to the left by the spring with such force that the fingers 177 strike the shoulders 190 of frame 183 and abruptly move the latter into the position shown in Fig. 18. The switch contacts 195 and 196 are thus opened so quickly that no arcing occurs. The thermostat bar 30 being disconnected from arm 174 does not partake of the snap-over movement of the arm by spring 180, so that the thermostat bar does not interfere with the sudden movement of arm 174 to break the circuit abruptly.

Figures 17, 18, 19:
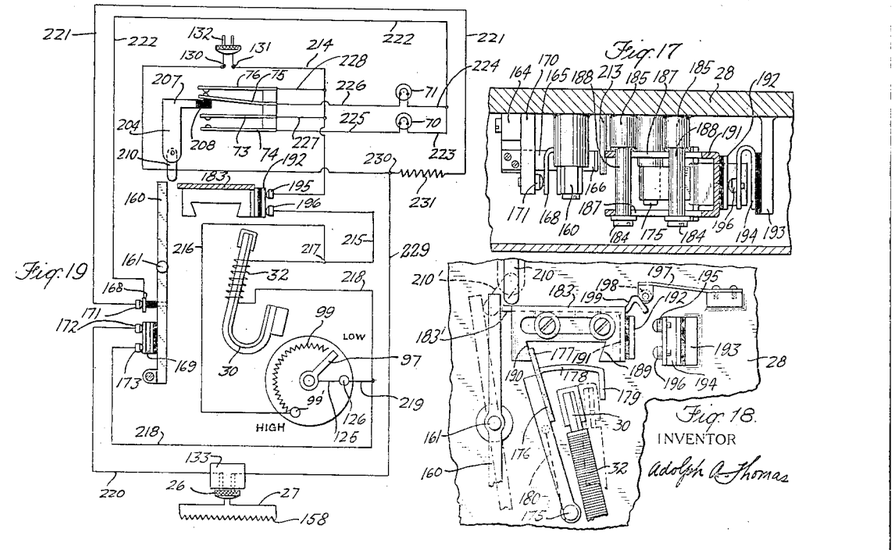
Fig. 17 is a plan view approximately on the broken line 17—17 of Fig. 15.
Fig. 18 is a fragmentary face view showing the thermostat switch of Fig. 15 in open position.
Fig. 19 is a circuit diagram of the electrical connections in the control box of Figs. 15—18.

As the thermostat bar 30 begins to cool, due to the coil 32 being out of circuit, it moves slowly back toward the right to normal position. The initial return movements of bar 30 do not affect the actuated arm 174, because the free end of the bar is out of contact with tail 178 of the arm. However, when the free end of the cooling thermostat bar 30 engages the extension 179 of arm 174, as indicated in Fig. 18, the thermostat bar and the arm are coupled together so that further movement of the bar toward the right carries the arm along. When the tension line of spring 180 moves to the right of pivot 175, the arm 174 is quickly snapped back to normal position with such force that the slidable frame 183 is abruptly shifted to the circuit-closing position shown in Fig. 15. The circuits being thus closed again, the heating action of coil 32 causes the thermostat bar 30 to open the switch contacts 195—196 after a predetermined interval, and then the circuit is again automatically closed in the manner described. When the fingers 177 of arm 174 move away from the shoulders 190 of frame 183, the latter is firmly held in actuated position by the spring-pressed cam roller 198. It is, of course, understood that the snap-over spring 180 is sufficiently strong to operate the frame 183 against the retarding friction exerted by the relatively weak spring 197. It is to be noted that the preliminary movement of the thermostat bar 30 and pivoted arm 174 have no effect on the position of the slidable switch frame 183, so that the circuit remains positively closed and open until the moment when the arm 174 is actually snapped into final position by the tensioned spring 180.

The slidable switch frame 183 is utilized to throw the pivoted switch lever 160 into circuit-opening position by means of a manually adjustable connection, which I shall now describe. An arm 200 is pivoted at one end on a pin or stud 201 projecting upwardly from the bottom plate 28. A suitable finger piece 202 is connected to arm 200 and projects through a slot 203 in the top plate or cover 12 of the box. A right-angled frame 204 is connected to arm 200 by a pin 205. Two pairs of spaced rollers 206 guide the frame 204 in its movements. The upper end of frame 204 has a lateral extension 207 which terminates in a head 208 arranged to project between the spring arms 73 and 75. These are the same as (or correspond to) the spring arms similarly numbered in the construction of Figs. 1–14. If the reciprocable frame 204 is of metal, the switch-operating head 208 should be of insulating material. The lower end of frame 204 carries a pin 209 on which a tongue 210 is pivoted. A post 211 on bottom plate 28 carries a spring blade 212 which is secured at the middle and shaped at the ends to receive the free end of arm 200 in either of its two positions. Any other means may be provided for releasably holding the pivoted arm 200 in the position to which it has been moved by the finger piece 202.

Figure 15:
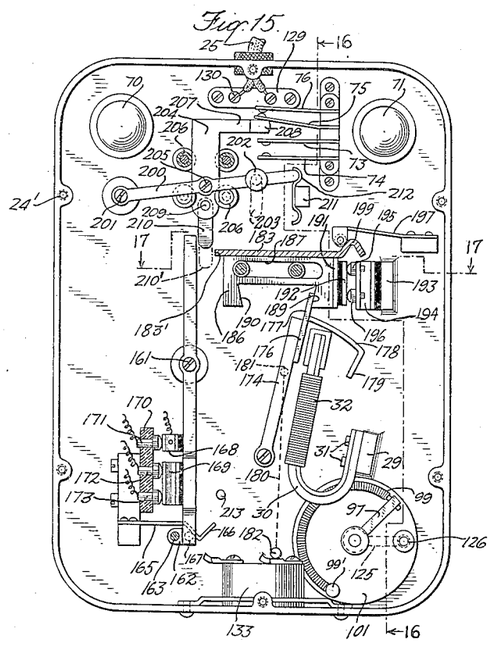
Fig. 15 shows a modified form of thermostatic control mechanism embodying my invention.
Figure 16:
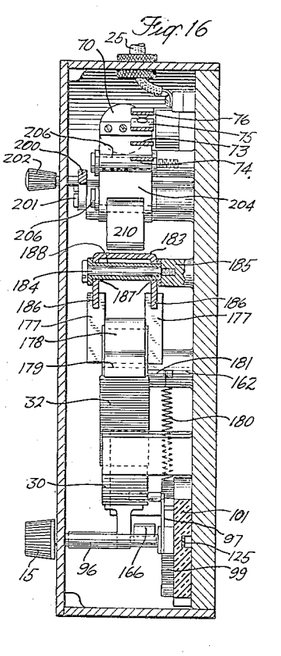
Fig. 16 represents a side view on the broken line 16—16 of Fig. 15.

When the arm 200 is in the position shown in Fig. 15, the tongue 210 on frame 204 is out of the path of frame 183, so that the projecting edge 183' of this frame does not engage the switch lever 160, which therefore remains in circuit-closing position, as will be clear from Fig. 18. Consequently, when the frame 183 is moved back to normal position by the cooling of thermostat bar 30, the circuit is automatically closed through heating coil 32 and working device 158. If the user does not desire this automatic reset, but wants the circuit to remain open until manually closed, he simply pushes the finger piece 202 down so that the tongue 210 now hangs in the space between the upper end of lever 160 and the edge 183' of frame 183. This coupling position of tongue 210 is indicated by the dotted outline 210 in Figs. 15 and 18. Therefore, when the frame 183 is next actuated to the left by the pivoted arm 174, the switch lever 160 is rocked counterclockwise until it strikes the fixed stop 213 against which it is held by the spring 165. The opening of switch contacts 172 and 173 prevents closing of the circuit through coil 32 and device 158, even after the frame 183 has been moved back to normal position. This will be clearly understood from the circuit diagram of Fig. 19, to which I shall now refer.

Switch contact 195 is connected to terminal 131 by wire 214, and contact 196 is connected to one side of coil 32 by wire 215. The terminal 99' of resistance element 99 is connected by wire 216 to wire 215 at point 217. A wire 218 connects the switch contact 173 with the other side of coil 32, and wire 219 connects the rheostat binding post 126 to wire 218. The rheostat 97—99 is therefore in shunt to the thermostat coil 32, the same as in the embodiment of Figs. 1-14. Switch contact 172 is connected to one side of switch 133 by wire 220, and wire 221 connects terminal 130 to switch contact 171. The insulated contact 168 mounted on the pivoted switch lever 160 is connected by wire 222 to one side of the signal lamps 70 and 71 through parallel branch wires 223 and 224, respectively. The other side of lamp 70 is connected by wire 225 to switch contact 74, and the other side of lamp 71 is connected by wire 226 to the movable switch member 75. The switch contacts 73 and 76 are connected in parallel to conductor 214 by wires 227 and 228. A wire 229 is connected at 230 to conductor 221, and the other end of the wire goes to switch 133. A resistance 231 may be inserted in conductor 221 to cut down the voltage passing through lamps 70 and 71, if that should be found necessary.

It is clear from Fig. 19 that the circuit of heating coil 32 and working device 158 is closed through the switches 195—196 and 172—173 in series, so that both of these switches must be closed to complete the circuit. As long as the switch contacts 172—173 remain closed, the thermostat bar 30 automatically closes and opens the circuit through coil 32 and device 158 at predetermined intervals. The frequency of this current interruption is controlled by the rheostat arm 97, as previously explained in detail. When the controlling arm 200 is pulled down to move the tongue 210 into coupling position, the opening of switch contacts 195—196 is accompanied by the opening of contacts 168—171 and 172—173. Since the switch lever 160 is held in open position and has no connection with thermostat bar 30, the circuit through coil 32 and device 158 remains open even after the slidable frame 183 has been moved back to normal position by the spring-actuated arm 174. The circuit therefore remains open until the lever 160 is manually restored to normal circuit-closing position by means of a suitable piece on the cover of the box, as more fully explained in connection with lever 33 in Figs. 1-14.

The circuit of signal lamps 70 and 71 is closed through contacts 168—171, but only one lamp is lighted at a time, because the head 208 of the movable frame 204 closes either the switch contacts 73—74 of lamp 70 or switch contacts 75—76 of lamp 71. When the lever 200 is in the position shown in Fig. 15, the automatic reset is on and the circuit is closed through lamp 71 which lights the red lens 21. When the arm 200 is pulled down for the manual reset, the switch contacts 73—74 are closed and lamp 70 shines through the green lens 20. In this case there is no rheostat for lamp 70 to vary its degree of brightness, but such a rheostat may be incorporated if desired. It is to be noted that no special provisions are necessary to lock the arm 200 against operation when the frame 183 is moved to the left, because the frame automatically acts as a stop for tongue 210, so that the finger piece 207 can not be pushed down by the operator.

The box or casing 10, which need be no bigger in actual size than the illustration of Fig. 1, can be made of molded insulating material of the bakelite type, or cast of light strong metal like aluminum, or stamped from sheet metal. The base plate 28 is here shown as a separate member attached to the body of the box by screws 28', but it may obviously be an integral part of the body. If desired or found commercially advisable, the inside of the box may be lined with asbestos or other heat-insulating material. The face view of Fig. 1 may also be considered as representing the box of Figs. 15—16, except that the transversely slidable finger piece 13 is replaced by the finger piece 202 movable lengthwise of the box. In its finished commercial form, this box is suitably colored and ornamented, particularly the cover 12 with its various legends and designs. To the housewife the most important use of my new control box is probably the regulation of temperature in electric heating appliances, especially flat irons, which the automatic reset prevents from getting too hot or too cold. By shifting the finger piece 13 or 202 to the manual reset, my controlling device becomes a time switch for automatically opening an electric circuit after a predetermined interval of time, which is variable by means of knob 15. Thus, by connecting a radio receiver or an electric fan to box 10, a person in bed may fall asleep to the sound of music or a cooling breeze, and so many minutes later the radio or the fan, or whatever instrument it may be, is automatically turned off. When the manual reset is on and the pointer 22 is in position 22b, the box operates like an ordinary switch that holds the circuit closed until the finger piece 14 is moved to "off" position. It is thus seen that one little box is capable of controlling an electric circuit in a variety of ways without changing any outside connections, but simply by the easy manipulation of convenient finger pieces.

Although I have shown and described certain specific constructions, I want it understood that my invention is not limited to the details set forth. The various features of novelty included in my invention may be mechanically embodied in other ways than herein described, without departing from the scope of the appended claims. It goes without saying that certain features of my invention may be used without others.

I claim as my invention:

1. The combination of a switch member, a thermostat bar, an adjustable mechanical transmission connection between said parts, said connection including means whereby said thermostat actuates said switch member to open and closed positions in automatically repeated sequence at predetermined changes of temperature, and manually controlled means for breaking said connection.

2. The combination of a movable switch element, a thermostat element, a mechanical connection between said elements whereby the thermostat element at predetermined temperature changes opens and closes the switch element in automatically repeated sequence, and manually controlled means whereby said connection is readily separable and restorable.

3. The combination of a movable element capable of occupying two positions, a thermostat element, means whereby the movements of said thermostat element at predetermined temperature changes actuate said first element from one position to the other in automatically repeated sequence, an adjustable finger piece, and means operated by said finger piece for mechanically connecting and disconnecting said elements.

4. The combination of a thermostat member, an electric heating element for said member, switch mechanism operated by said member to open and close the circuit of said element in automatically repeated sequence at predetermined high and low temperature limits, a manually adjustable connection adapted to prevent said thermostat member on cooling from closing said switch mechanism, and means whereby said adjustable connection does not interfere with the thermostatic movements of said member.

5. The combination of a movable switch member adapted to occupy two positions and to remain stable in either position, thermostatic connections for automatically moving said member back and forth at predetermined intervals, and manually controlled mechanical means for rendering said connections inoperative in relation to said switch member, said means permitting free thermostatic movements of said connections while the latter remain out of engagement with said switch member.

6. The combination of an electric switch member normally in circuit-closing position, a heating coil controlled by said switch member, a thermostat bar subject to the heat of said coil for actuating said member to open the circuit, means whereby said thermostat bar on cooling automatically returns said member to normal circuit-closing position, whereupon said coil again heats the thermostat bar until said switch is again opened, so that the circuit opening and closing operations of said switch member by the thermostat bar are repeated in automatic sequence, and manually controlled mechanical connections for rendering said means inoperative without interfering with the movements of said thermostat bar under changes of temperature.

7. The combination of a movable switch member, a thermostat element mechanically connected to said member for operating said member alternately to circuit-opening and circuit-closing positions, and manually controlled means for selectively eliminating either operation of said member without interfering with the thermostatic movements of said element.

8. A normally closed switch member, thermostatic means for automatically opening and closing said member in repeated sequence at predetermined intervals, and manually controlled means for eliminating the circuit-closing operation of said thermostatic means without interfering with the movements of said thermostatic means under changes of temperature, so that said switch member remains in open position, said eliminating means including a separable mechanical connection between said thermostatic means and said switch member.

9. An electric switch comprising a pivoted contact lever mounted to assume two positions and to remain stable in either position, thermostatic means mechanically connected to said lever for automatically actuating said lever back and forth from one position to the other at predetermined intervals, and manually controlled means for breaking said mechanical connection and thereby eliminating one operation of said thermostatic means, whereby said lever remains in actuated position.

10. The combination of a movable switch member, thermostatic means mechanically connected with said member for actuating the same to open and close an electric circuit in automatically repeated sequence at certain intervals, manually controlled means for eliminating the circuit-closing operation of said thermostatic means, whereby said switch member remains in open position, and a finger piece for moving said member to circuit-closing position.

11. The combination of a movable switch member adapted to occupy two positions and to remain stable in either position, thermostatic connections for automatically moving said member back and forth in repeated sequence at predetermined intervals, said connections including a transmission element movable back and forth by the thermostatic action of said connections, and means whereby said element is manually adjustable to remain out of mechanical engagement with said switch member during the thermostatic operation of said connections, and visual signal means automatically controlled by said manual means for indicating the condition of said connections.

12. A normally closed switch member, thermostatic means mechanically connected with said member for automatically opening and closing said member in repeated sequence at predetermined intervals, manually controlled electric means for varying said intervals, separate means for eliminating the circuit-closing operation of said thermostatic means by breaking said mechanical connection, so that said switch member remains in open position, and a finger piece for moving said member to circuit-closing position.

13. A thermostatic switch comprising a movable switch member normally held in closing position, a pivoted arm movable independently of said switch member, a spring connected to said arm for snapping the same in opposite directions against said switch member, whereby said arm abruptly moves said switch member from one position to the other, and thermostatic means for rocking said arm about its pivot in alternately opposite directions to cause the snap-over movements of the arm by said spring.

14. A thermostat switch comprising a pivoted snap-over member, a thermostat bar mechanically connected with said member for moving said member from one position to the other, means whereby the movements of said thermostat bar in opposite directions at predetermined changes of temperature cause said mechanical connection to operate said switch member back and forth in automatically repeated sequence, a movable switch element operated by said member for opening and closing a circuit, said switch element being adapted to remain in either of its actuated positions, and means whereby the preliminary movements of said member prior to the snap-over operation do not affect the position of said switch element, which remains positively closed and open until abruptly actuated by the snap-over operations of said member.

15. A circuit control unit comprising an outer case or box, a movable switch member in said case, a movable finger piece projecting from said case for operating said switch member, thermostatic means in said case for operating said switch member, a second movable finger piece on said case, connections controlled by the second finger piece for causing said thermostatic means to automatically open and close said switch member at predetermined intervals, and means for causing said switch member to remain in open position.

16. The combination of a movable switch member, a thermostat element for operating said switch member alternately to open and closed positions, a manually adjustable device for eliminating the circuit-closing operation of said thermostat element and causing said switch member to remain in open position, a finger piece for closing said switch member independently of said thermostat element, and means controlled by the circuit-opening position of said switch member for locking said device against operation until said switch member is manually restored to closed position.

17. A circuit control unit comprising an outer box, a movable switch member in said box, a movable finger piece on said box for operating said switch member to close and open a circuit, thermostatic means in said box for operating said switch member, a second movable finger piece on said box, connections controlled by the second finger piece for either causing said thermostatic means to actuate said switch member to open and closed positions at predetermined intervals in repeated sequence or causing said switch member to remain in open position, a pair of differently colored signal lamps carried by said box, and switches controlled by the position of the second finger piece for lighting either signal to indicate the operative relation of said thermostatic means to said switch member.

18. A circuit control unit comprising an outer case or box, a movable switch member in said case, a movable finger piece on said case for operating said switch member to close and open a circuit, thermostatic means in said case for operating said switch member, a second movable finger piece on said case, connections controlled by the second finger piece for either causing said thermostatic means to automatically open and close the circuit at predetermined intervals or causing said switch member to remain in open position, a pair of differently colored signal lamps carried by said case, switches controlled by the position of the second finger piece for lighting either signal to indicate the operative relation of said thermostatic means to said switch member, and a third movable finger piece on said case for regulating the frequency of operation of said thermostatic means.

19. A thermostat switch including a pair of stationary contacts, a temperature-responsive element, a rockable actuator operated by said element, a movable member carrying contact means arranged to engage said stationary contacts to close an electric circuit, a spring connected to said actuator, and means whereby said spring urges said member toward said contacts in circuit-closing position of the actuator and away from said contacts in open-circuit position of the actuator, said spring being controlled by the movements of said actuator to snap said member into circuit-breaking and circuit-closing positions.

20. In a circuit-controlling device, the combination of a switch, a thermal element for operating the switch from one position to another when the thermal element becomes heated and for returning the switch to the first position with a time-delay dependent upon the cooling of the thermal element, heating means for the thermal element controlled by the switch, and means for operating the switch to and maintaining the same in open position even when said thermal element remains heated.

21. In a circuit-controlling device, the combination of a switch, a thermal element for operating the switch from a predetermined position to another position when the thermal element is subjected to a certain temperature and for returning the switch to said predetermined position with a time-delay dependent upon a predetermined change of temperature of the thermal element, heating means for the thermal element controlled by the switch, and means for operating the switch to and maintaining the same in open position even when said thermal element remains heated, said means including a hand-operable pivoted member.

22. In an automatic switch, the combination comprising, a thermostatic member having an engaging portion, a movable switch actuator, a pivotally mounted trigger biased in one direction and having extending arms, one of said arms adapted to directly engage said portion, and the other of said arms directly engaging the actuator, a movable switch arm operated by said actuator to open position, and manually controlled means for preventing operation of said switch arm by said actuator, whereby the operation of said switch arm is taken out of the control of said thermostatic member.

23. In a time-controlled circuit controller, a timed moving element, a pair of relatively movable contacts, a movable member, and means operatively associating the moving element and the movable member to move said contacts relatively to each other, said means including two relatively movable parts which constitute a lost-motion driving connection and which engage only after one of said parts has rotated through a certain angle, whereby there is effected a predetermined movement of the element without actuating the member.

24. In a time-controlled circuit controller, a timed moving element, a pair of relatively movable contacts, a pivoted arm, and means operatively associating the moving element and the pivoted arm to move said contacts relatively to each other, said means including two relatively movable parts which constitute a lost-motion driving connection and which engage only after one of said parts has rotated through a certain angle, whereby there is effected a predetermined movement of the element without actuating said arm.

ADOLPH A. THOMAS.